(12) United States Patent
Walthert et al.

(10) Patent No.: US 10,343,741 B2
(45) Date of Patent: Jul. 9, 2019

(54) BICYCLE COMPONENT, BICYCLE AND METHOD

(71) Applicant: DT SWISS INC, Grand Junction, CO (US)

(72) Inventors: Martin Walthert, Aarberg (CH); Valentin Wendel, Bern (CH); Stefan Battlogg, St. Anton I. M. (AT)

(73) Assignee: DT Swiss Inc., Grand Junction, CO (US)

( * ) Notice: Subject to any disclaimer, the term of this patent is extended or adjusted under 35 U.S.C. 154(b) by 52 days.

(21) Appl. No.: 15/158,105

(22) Filed: May 18, 2016

(65) Prior Publication Data

US 2016/0339990 A1 Nov. 24, 2016

(30) Foreign Application Priority Data

May 18, 2015 (DE) .......................... 10 2015 107 701

(51) Int. Cl.
*B62K 25/06* (2006.01)
*B62K 25/30* (2006.01)
(Continued)

(52) U.S. Cl.
CPC .......... *B62K 25/06* (2013.01); *B60G 17/0165* (2013.01); *B60G 17/08* (2013.01); *B62K 25/04* (2013.01); *B62K 25/08* (2013.01); *B62K 25/286* (2013.01); *B62K 25/30* (2013.01); *F16F 9/50* (2013.01); *B60G 2300/12* (2013.01); *B60G 2400/202* (2013.01); *B60G 2400/204* (2013.01); *B60G 2400/823* (2013.01); *B60G 2401/176* (2013.01); *B60G 2500/10* (2013.01);
(Continued)

(58) Field of Classification Search
None
See application file for complete search history.

(56) References Cited

U.S. PATENT DOCUMENTS 6,233,510 B1 * 5/2001 Platner ................... B60G 13/16
382/104
8,886,403 B2 11/2014 Battlogg et al.
(Continued)

FOREIGN PATENT DOCUMENTS

DE 20017267 U1 12/2000
DE 102010055828 A1 6/2012
(Continued)

*Primary Examiner* — Abby Y Lin
*Assistant Examiner* — Kyung J Kim
(74) *Attorney, Agent, or Firm* — Laurence A. Greenberg; Werner H. Stemer; Ralph E. Locher

(57) ABSTRACT

A bicycle component for an at least partially human-powered bicycle has a shock absorber device. The shock absorber device includes a damper device which can be controlled by a control device. A detection device is provided with a sensor device for receiving a signal. The sensor device is arranged on at least one component of the bicycle which is pivoted in the case of a steering movement. The detection device is suitable for detecting, and is designed to detect, the difficulty in the terrain as a function of the acquired signal, and is configured to control the damper device as a function of the detected difficulty in the terrain, with the result that a damping property of the damper device can be adjusted by way of a signal of the detection device.

21 Claims, 4 Drawing Sheets

(51) Int. Cl.
  *B62K 25/28*    (2006.01)
  *B62K 25/08*    (2006.01)
  *F16F 9/50*     (2006.01)
  *B62K 25/04*    (2006.01)
  *B60G 17/0165*  (2006.01)
  *B60G 17/08*    (2006.01)
  *F16F 9/46*     (2006.01)
  *F16F 9/53*     (2006.01)

(52) U.S. Cl.
  CPC ...... *B60G 2500/30* (2013.01); *B60G 2600/04* (2013.01); *B60G 2600/202* (2013.01); *B62K 2025/044* (2013.01); *B62K 2207/00* (2013.01); *F16F 9/46* (2013.01); *F16F 9/53* (2013.01)

(56) References Cited

U.S. PATENT DOCUMENTS

| | | | |
|---|---|---|---|
| 8,967,343 B2 | 3/2015 | Battlogg et al. | |
| 9,051,988 B2 | 6/2015 | Battlogg et al. | |
| 2001/0030408 A1* | 10/2001 | Miyoshi | B62K 25/04 280/276 |
| 2011/0127706 A1* | 6/2011 | Sims | B60G 17/018 267/221 |
| 2012/0160621 A1 | 6/2012 | Battlogg et al. | |

FOREIGN PATENT DOCUMENTS

| | | |
|---|---|---|
| DE | 102011009405 A1 | 7/2012 |
| EP | 2468615 B1 | 5/2015 |
| EP | 2468616 B1 | 7/2015 |

\* cited by examiner

BICYCLE COMPONENT, BICYCLE AND METHOD

BACKGROUND OF THE INVENTION

Field of the Invention

The present invention relates to a bicycle component for an at least partially muscle-powered bicycle and in particular a mountainbike comprising at least one shock absorber device and a bicycle and in particular a mountainbike comprising such a bicycle component, and a method for operating a bicycle component. The shock absorber device comprises at least one damper device that can be controlled by at least one control device.

Shock absorption has a major influence on the riding characteristics and therefore it constitutes a significant feature of bicycles and in particular sports bicycles such as mountainbikes. Thus, shock absorbers allow improved ground contact and enable a sporty riding style even in extremely rough terrain remote from streets or paved paths. As a rule, shock-absorbing bicycles comprise a suspension fork which tends to be supplemented by a rear wheel damper. Such a shock absorber usually comprises a spring unit for springing any shocks and a damping unit for damping the spring vibration.

For optimal utilization of the benefits of shock absorption, setting the damping and spring characteristics is as a rule indispensable. Criteria for setting include e.g. the rider's weight and his riding style, and the characteristics of the envisaged terrain.

As a rule this requires adjusting the shock absorbers including setting and coordinating a number of parameters for damping and springing. These adjustments are not without problems though, in particular for beginners. A combination of less than optimal settings may in extreme cases even deteriorate the riding characteristics.

Therefore the prior art has disclosed shock absorbers for use on bicycles providing, specifically for beginners, only a few or just the major adjusting options. In contrast thereto, shock absorbers for advanced users or experts may include a larger number of adjustment options.

Thus, for example DE 10 2011 009 405 A1 has disclosed a damper whose damping characteristics can be adjusted by means of an electronic unit. The electronic unit is provided to be exchangeable so that a beginner or a novice may use an electronic unit having just a few adjustment options or none at all while experienced users or experts may use a model having more complex adjustment options.

However, there is the problem that even in case of optimal basic settings the shock absorber may require subsequent adjustments if the damping requirements change during use. This is the case specifically if the rider travels through a terrain showing hugely varying characteristics. Therefore the prior art has disclosed dampers which allow adjusting the damping characteristics during a ride for example by way of a control cable.

The known solutions show the disadvantage though that adjustments during a ride require some of the rider's concentration. This is critical in particular in rides on difficult tracks or steep, narrow, and unsurfaced paths. Moreover these terrains as a rule require frequent adjustments to the shock absorbers which keep diverting the rider's attention specifically in challenging riding situations.

Controllable shock absorbers are basically known in motor vehicles. They use controllable shock absorbers which operate in dependence on sensor data. Modern-day motor vehicles may comprise sensor systems showing anticipating features to indicate obstacles on the road surface or to automatically respond appropriately. These sensor systems need to capture the road and any obstacles in front of the motor vehicle. Although the sensory recognition is limited to the section of road immediately in front of the motor vehicle, very large amounts of data need to be analyzed so as to require very high and very fast computing capacity since the data must be evaluated in real time. The evaluating system benefits from the fact that the course of the road is known and complies with standardized rules. Only the section of road in front of the motor vehicle needs to be captured and evaluated. Capturing and evaluating any trees or buildings on the sides of the road is not necessary. The courses of roads show only slight curves as a rule, and if a narrow curve approaches the motor vehicle travels at a correspondingly slower speed. The technical complexity for manufacturing these shock absorbers and the energy requirements in operating shock absorbers are secondary in motor vehicles having engine powers in the magnitude of 100 kW even though energy consumption is an aspect. In motor vehicles it is basically not significant whether the controlling system continuously requires 10 watt or 100 w or more. In bicycles this power requirement is not possible, the requirements are different even if the bicycle comprises assistance by electric motor.

Moreover the paths which mountainbikes use tend to change abruptly anytime. Unsurfaced forest paths are as a rule very narrow and may show hairpin bends or a serpentine course. Moreover the ground shows no markings for the path for evaluating so as to determine the further course. Also, the path may show forkings next to trees or other large or small obstacles. Thus, with the technology available to date it is virtually impossible to capture the required, extremely wide area in the traveling direction in front of the bicycle and to make useful checks for conceivable obstacles so as to adjust a shock absorber in advance for a concrete impact on an obstacle. One of the reasons therefor is that the course of the path is as a rule unknown and it is not only the actually travelled path that must be considered but so must a multitude of other conceivable paths (closely) adjacent thereto.

For the reasons indicated the technology applied in motor vehicles cannot be transferred to bicycles and in particular to mountainbikes.

EP 2 468 615 B1 has disclosed a suspension control for bicycles where a shock absorber is adjusted in dependence on the current sensor data. In a level route segment, weak damping will be set while in a route segment where severe shocks are expected a stronger damping will be set, and for uphill rides, lockout will be set. Manual changes to the automatically set damping values are possible.

EP 2 468 616 B1 has disclosed a suspension control where a control device provides a learning mode, storing route-related GPS data in a memory device and where in a repeat mode the damper device is controlled according to the route-related data stored in the memory device. This allows to store and set optimal damping conditions for a known route or for laps, for each rider individually. The drawback is that this is possible on known routes only.

U.S. Pat. No. 9,501,988 B2 has disclosed a shock absorber and a method of operating a shock absorber with a magnetorheologic fluid, obtaining a relative speed in real time and then adjusting the resulting damping force in real time. In this kind of system the response to the current load conditions is adequate at all times. Response will not be e.g. to the average loads in the 100 m distance just passed but individually, to each single rock or each single root, even while the bicycle is going over. The system operates reliably. Its drawback is that prior to the shock there is no information whatever about an obstacle.

BRIEF SUMMARY OF THE INVENTION

It is therefore the object of the present invention to provide a bicycle component which enables improved adaptation of damping characteristics during rides, in particular also in unknown terrain.

This object is solved by a bicycle component having the features as claimed and by a method as claimed. Preferred specific embodiments of the invention are the subjects of the subclaims. Further advantages and features follow from the general description and the description of the exemplary embodiments.

The bicycle component according to the invention is suitable and provided for an at least partially musclepowered bicycle. The bicycle comprises at least one shock absorber device having at least one controllable damper device. The damper device is controllable by at least one control device. The control device is in particular part of the bicycle component. The control device may be part of the bicycle as well. The bicycle component comprises at least one identification device having at least one sensor device. The sensor device comprises at least one receiving unit for non-contact capturing of at least one signal. The sensor device is disposed on (at least) one component of the bicycle which can, or will, pivot along with a steering movement. Or else the sensor device is disposed such that the sensor device at least partially pivots along with a steering movement of the bicycle. The identification device is suitable and configured for contactless identification of the hazard in dependence on the captured signal. The identification device is moreover suitable and configured to control at least one shock absorber device or at least one damper device in dependence on the identified hazard so that at least one damping characteristic of the shock absorber device is adjustable by way of a signal from the identification device.

At least one identification device having at least one sensor device is provided which comprises at least one receiving unit to capture at least one signal. The identification device is suitable and configured to identify at least one hazard in dependence on the captured signal and to control at least one shock absorber device in dependence on the identified hazard so that at least one damping characteristic of the shock absorber device is adjustable by way of a signal of the identification device.

The bicycle component according to the invention has many advantages. It is a considerable advantage that hazards are recognized and that the damper device is adjusted according to the identified hazard. This allows great ease and comfort in adapting the damping characteristics to the currently prevailing terrain conditions. The rider may for example move directly from a level forest road to a challenging path showing a multitude of rough patches and steps without having to think about modifying the damping characteristics.

It is a great advantage that the sensor device or at least part of the sensor device pivots along with steering movements. This is one of the reasons which enable practical use in bicycles in the first place. The area required for capturing in front of the bicycle can be quite considerably reduced since capturing and evaluating is virtually only done for a narrow strip in front of the edge of the front wheel tire. It is not necessary to capture and evaluate the entire width of a paved road but for example only a width of 0.25 m or 0.5 m in front of the front wheel and a length of 1 m or 2 m or else only 0.5 m in front of the front wheel may be captured and evaluated. Any objects and obstacles captured in this area may preferably be taken into account for controlling.

Preferably the sensor device is disposed on at least one component of the bicycle which is pivotable with steering movements. The advantage thereof is that the sensor device is substantially always oriented in the traveling direction. The sensor device can in particular be disposed at, attached to, or pivotally connected with, the handle or the handlebar or the fork or the front wheel. In all the configurations the sensor device may comprise at least one transmitting unit and at least one receiving unit. Preferably the bicycle component comprises a computer which evaluates the data captured by the sensor device. The identification device may comprise the computer.

Preferably the sensor device is disposed at the front wheel, at the fork and/or at the handlebar and/or at the stem. It is also possible to dispose the sensor device on a component of the front wheel hub. It is possible to dispose the transmitting unit and the receiving unit spaced apart from one another and/or on separate components. It is also possible to provide just part of the sensor device such as a receiving unit to pivot with the steering. Another part of the sensor device such as a transmitting unit may be disposed on a component of the bicycle that remains stationary in steering movements. In any case the advantage ensues that only a small portion in front of the bicycle needs to be checked for hazards. This allows to considerably reduce the range for capturing so as to allow reliable evaluation while requiring little complexity and comparatively small computer capacity.

In any case at least part of the sensor device is pivotable with a steering movement. The part of the sensor device or the entire sensor device may be attached to a stationary part of the bicycle component as long as transmission of the steering movement to the sensor device respectively to the pivotable part of the sensor device is ensured. This may be done by means of a coupling such as a coupling mechanism or a transmission or a belt or toothed belt etc. It is also possible for the sensor device to be (at least partially) pivoted motor-assisted when steering movement takes place.

Preferably the identification device is suitable and configured to capture and/or classify the type of way such as a forest path, downhill track, paved road, etc. Preferably the identification device is suitable and configured to specify the near zone in dependence on the identified type of way. For example in the case that the type of way is "road" and in particular "smooth road", a larger near zone is preferably set. Then a considerably larger near zone is preferably checked for conceivable hazards. However, if the type of way is recognized as a "forest path" or "downhill track", the near zone for capturing and evaluating is preferably reduced.

There are various ways of determining the type of way. The type of way may be derived by way of GPS coordinates. Or the type of way can be specified manually. It is also possible to have the type of way recognized optically (e.g. with a camera). It is also preferred for the identification device to be suitable and configured to classify the type of way in dependence on the frequency and intensity of any hazards ridden over. Frequent and severe shocks allow to conclude a downhill track, at any rate if the GPS signal and/or a position sensor identifies a down slope.

Preferably the identification device is suitable and configured to derive a probability value for riding over an identified hazard and if a predetermined probability is exceeded, to adjust the shock absorber device in dependence on the identified hazard and/or to "get ready for" the identified hazard.

The probability of riding over a hazard (all the identified hazards) is preferably periodically verified respectively recomputed. Thus, specifically when riding on a narrow forest path, it may appear very likely from a distance of 1 m that an identified tree root or fist-sized boulder will be run over while subsequent steering movements of the rider make it clear from a distance of 50 cm to the front edge of the front wheel that the stone is no longer in the riding path of the bicycle. Thus, the identification device is preferably suitable and configured to periodically determine the probability for an identified hazard to be run over, in (short) time intervals of e.g. 10 ms, 20 ms or 50 ms or 100 ms.

The frequency of determining may be dependent on the traveling speed and on the distance from an identified hazard.

It is another advantage that the damping force can be quite intentionally set to a specific hazard that is expected shortly. Thus, for example minor unevennesses may be dampened at less strength than large steps in the terrain. Such a modification of the damping characteristics to the currently prevailing terrain enables optimal utilization of the maximum damping achievable of a shock absorber so that the suspension will always be adapted even given an extreme riding style. Moreover, better utilization allows smaller dimensions of the shock absorber so that weight is saved as well. Damper strokes can be "stored" or "retained" so as to leave a sufficient stroke length for the hazard that is already perceived in front of the front wheel.

The identification device is in particular suitable and configured to characterize the hazard at least in part by way of the captured signal. Such characterizing is for example, determining a shape or geometry of the hazard and/or classification of the hazard in a stored category and/or measuring the distance. For example the height and/or the angle to the ground and/or the angle of at least one side surface of the hazard may be determined.

The term hazard in the sense of the present invention is in particular understood to mean at least one obstacle in the riding track which, in case riding continues on track, may cause impact on the suspension so as to activate the damper device.

Preferably the damper device and the control device are configured such that a damping characteristic of the damper device can be changed by at least 50% of the adjustment range in under 30 ms. Preferably a damping characteristic of the damper device is adjustable at random over the entire adjusting range in under 30 ms. The damping characteristic of the damper device is in particular adjustable in under 30 ms seconds due to an identified hazard in the near zone.

Basically it may be difficult to predict the riding path since riders tend to swerve around obstacles more or less by instinct unless it extends across the entire track width. Then it may happen that a hazard is identified and the shock absorber device is adjusted or readied for adjustment. Thereafter the obstacle may be out of the way due to going around so that the expected event does not occur because the rider changes his traveling way. In preferred embodiments this is no problem since the shock absorber device can be set in under 30 ms and in particular under 10 ms so as to avoid the sudden presence of settings which will never be needed. Advantageously the damper device is equipped with a magnetorheological fluid and a controllable damping valve. One advantage of these damper devices is the enormous speed at which modifications can be set.

This means that it is not required to "look" far ahead to identify a hazard. This means that as a hazard is identified, it is in fact relevant. Swerving can preferably be identified preferably by detecting and taking into account steering movements.

The receiving unit is for example configured as a camera, comprising at least one image sensor. The image sensor is preferably suitable to capture an optical projection of the hazard. The optical projection may be provided to be captured in the visible light range and/or infrared range and/or in a range of shorter or longer wavelengths. The camera may comprise at least one objective. At least one filter and/or at least one intensifier device and/or image stabilizer device may be provided. A stereo camera for capturing spatial information about the hazard is also possible.

Preferably the control device is suitable and configured to change the damping of the damper device up to reaching an identified hazard and in particular to increase the hardness. This is in particular done for large hazards whose height is, or exceeds, e.g. 5 cm or 10 cm. This allows to ensure that as the hazard is reached, sufficient suspension travel is available to appropriately or optimally overcome the hazard. This applies in particular to jumps and other predictable or anticipated events.

It is also possible for the shock absorber device to comprise at least one controllable suspension device. The identification device may be suitable and configured to adjust at least one spring characteristic of the suspension device in dependence on the identified hazard. At least one electrically driven actuator may for example be provided for adjusting.

The shock absorber device may comprise a number of damper devices. The identification device can in particular control at least one damper device of the at least one damper devices of the shock absorber device.

The captured signal is in particular a signal changed or reflected by a hazard.

A particularly advantageous configuration of the sensor device comprises at least one transmitting unit. The transmitting unit is preferably suitable and configured to emit at least one signal. The receiving unit is preferably suitable and configured to receive, and to capture as a signal, at least one reflection of the emitted signal coming at least in part from the hazard. The identification device is preferably suitable and configured to identify the hazard in dependence on the captured signal. The identification device is moreover in particular suitable and configured to control the damper device in dependence on the identified hazard so that at least one damping characteristic of the damper device is adjustable by means of a signal from the identification device. Particularly advantageously the reflected signal may be processed by the identification device and utilized for a particularly reliable identification of hazards.

The emitted respectively received signal is in particular a transverse wave and/or a longitudinal wave, for example an electromagnetic wave and/or a sound wave. It is possible to apply appropriate modulation on the wave. Emission is also possible as a pulse and in particular a very short pulse. Pulse position modulation may be provided. The differences between the emitted and reflected signals are for example characteristic of the size, the shape and/or the material composition of the hazard. The differences of the emitted and reflected signals for example relate to the amplitude, frequency, wavelength, phase and/or polarisation. It is also possible to obtain interferences between emitted and received signals. The sensor device may for example be configured as, or comprise, an interferometer. The signals used are preferably in short wavelength ranges such as visible light.

The transmitting unit and the receiving unit are preferably incorporated in at least one shared sensor. It is also possible for the transmitting unit and the receiving unit to be configured separately. Transmission between the sensor device and the identification device may be wireless. Or else at least one connecting line may be provided.

The damper device comprises in particular at least one first damper chamber and at least one second damper chamber. The damper chambers are coupled to one another in particular through at least one controllable damping valve. The adjustable damping characteristic is in particular at least one quantity of the damping. The damping characteristic is for example hard or soft damping.

In a particularly preferred specific embodiment at least one controllable field generating device is assigned to the damping valve. The field generating device is in particular suitable and configured to be controlled by the identification device. To this end for example an electric coil may be provided. The field generating device is in particular suitable and configured to generate and/or control a field intensity in at least one damping duct of the damping valve. A field-sensitive, rheological medium is preferably provided in the damping duct.

Preferably the damper device is provided with at least one magnetorheological fluid and comprises at least one adjustable magnetorheological damping valve. Or else at least one mechanically controlled damping valve is possible. The rheological medium employed is particularly preferably a magnetorheological medium and in particular a magnetorheological fluid. The resulting fluid viscosity is in particular influenced via the intensity and strength of the magnetic field built up by the field generating device.

In another particularly preferred specific embodiment the identification device is suitable and configured to control the damper device in dependence on hazards in a near zone. Hazards taken into account are preferably only those in the near zone. The near zone is in particular defined by at least one specification stored in the identification device such as a distance, length and/or width and/or angle. A dynamically adaptable near zone is also possible. The near zone may be provided to be adjusted by user specification.

The near zone may be for example 1 m or 2 m or 3 m or else 5 m or even more. It is also possible for the near zone to extend over 10 m or 15 m or even 20 m or more. The near zone may be under 1 m, for example 70 cm or 50 cm or 20 cm or else 10 cm or less. The near zone preferably extends forwardly from a range at the front edge of the bicycle in the traveling direction. The near zone for example begins in front of the front wheel and/or the handlebar region. The near zone is particularly preferably under 30 m and in particular under 10 m.

Taking account of hazards in a near zone offers considerable advantages since riding bicycles and in particular mountainbikes tends to involve numerous and very rapid changes of direction. Thus, far ahead identification would not be appropriate and rather a disadvantage since hazards might be taken into account which are ultimately not run over or are never intended to be run over. This shows in particular that a transfer of obstacle detection systems as they are known from the automotive field will not lead to solving the object identified above. The automotive field requires very far ahead detection of obstacles representing danger when continuing on the way intended. In the field of bicycles, however, it is as a rule desired to approach the hazards and pass over them with the bicycle. The present invention is thus not intended to support swerving around obstacles but specifically running over hazards by way of modifying damping characteristics.

The identification device is particularly preferably also suitable and configured to specify the near zone in dependence on the traveling speed of the bicycle. Preferably the near zone in particular extends over the maximum distance which the bicycle travels in one second according to the traveling speed. Such specification of the near zone in dependence on the traveling speed offers the advantage that substantially those hazards will be taken into account which are relevant to the loads on the suspension. The probability is very high that those hazards located for example in the range of approximately one second's travel from the front wheel will be run over.

It is also possible for the near zone to extend over the maximum distance which the bicycle travels according to the traveling speed in under one second and for example in half a second or particularly preferably in 0.2 seconds or preferably 0.1 seconds or less. It is also possible for the near zone to extend over the distance which the bicycle travels according to the traveling speed in over one second and for example in 1.5 seconds or 2 seconds or 3 seconds. The bicycle component may comprise suitable sensors for determining the traveling speed. Or else a speedometer and/or navigation system of the bicycle may be scanned. The near zone or its length can in particular be dependent on the type of the way. Thus, a long distance may be evaluated in rides on paved roads, while in rides on narrow paths through open terrain ("off-road") a near zone showing considerably shorter length (and/or width) is captured.

The time defining the extension of the near zone can be specified in dependence on a width of the near zone. The width of the near zone extends in particular transverse to the traveling direction. Or else the width of the near zone may be specified by a capturing angle of the sensor device. The capturing angle is for example determined by the angle at which the signal is emitted and/or by the angle at which the receiving unit receives a reflected signal. This configuration is advantageous since the width of the near zone influences the speed at which one can ride or swerve around an identified hazard which will then be irrelevant to damper control.

The identification device is preferably suitable and configured to adjust the damping characteristic of the damper device in under 30 milliseconds due to an identified hazard in the near zone. This time period is in particular understood to mean the time required for adjusting the damper after identifying a hazard. Evaluation of the sensor signals and identification of the hazard preferably also occur during such time and particularly preferably in a clearly shorter time period.

The damper device is in particular also suitable and configured to be adjusted by the identification device during the time period indicated. These short adjusting times offer the advantage to enable realizing short near zones. This increases the probability that the identified hazards will in fact be run over. Another advantage is that in the case of a sudden steering maneuver requiring re-identification of a hazard the damping characteristic can still be completely readjusted.

Rapid adjusting of the damping characteristic particularly preferably involves the damper valve and the associated field generating device. Adjusting the damping characteristic of the damper device in particular requires under 20 milliseconds or under 10 milliseconds and particularly preferably under 5 milliseconds. Adjusting may require under 3 milliseconds and in particular under 2 milliseconds. Or else adjusting is conceivable requiring more than 30 milliseconds, for example 50 milliseconds.

The identification device is in particular suitable and configured to determine and take into account the height of the hazard above ground for controlling the damper device. The identification device is preferably suitable and configured to determine the angle of at least part of the hazard relative to the ground and to take it into account for controlling the damper device. Damping can for example be adjusted softer in proportion to the steepness and/or height of the hazard.

Controlling is done for example in the sense of characteristic map control so as to match appropriate values of heights and/or angles with the respective stored damping hardness values. Or else, threshold value control is conceivable so that as a value exceeds and/or stays below a threshold regarding the height and/or angle, an associated damper hardness is set. It is also possible to configure a learning control. Then the controlling may comprise for example a learning algorithm and/or fuzzy logic and/or a neural network algorithm or the like.

In an advantageous configuration the identification device is suitable and configured to determine a distance from the hazard. The signals captured by the sensor device may be characteristic of a distance of the hazard from the sensor device. The identification device is in particular configured such that it determines from such a signal a distance of the hazard from a front wheel and/or a rear wheel of the bicycle. A correction factor may for example be provided for computing the distance between the front wheel and the hazard from the distance between the sensor device and the hazard.

The information about the distance between the front wheel and the hazard allows to compute the point in time at which the front wheel will make contact with the hazard. Thus, for example when taking into account the traveling speed the damper settings can be adjusted precisely as adjustment to the hazard is required. In combination with a configuration as described above where a field generating device is used for setting the damper, very fast and short-term responses are possible so that even hazards lying immediately in front of the front wheel allow responses with optimal damper settings.

In particular a look-ahead identification of a hazard such as a thick root or the like allows to store suspension travel in front of the hazard so that the available suspension travel for overcoming the hazard (root, rock, etc.) is safely sufficient for optimal damping. Absent look-ahead identification it might be required to set a much harder damping for running over the hazard than is actually desired if the available suspension travel has already been nearly used up or knockout is imminent.

In all the cases it is also possible to draw conclusions about the distance of a hazard already when identifying it. Then, additionally determining the distance is preferably not required. This may be the case for example if the detection range of the sensor device is focused accordingly so as to only register hazards within a specific range. Then for example immediately following identification of the hazard the point in time may be determined when the front wheel will make contact with the hazard, taking into account the traveling speed and the distance factor.

The identification device is preferably also suitable and configured to take into account at least one preset threshold value for a damping maximum for controlling the damper device. Controlling may also take into account a threshold value for a damping minimum. The threshold value may be provided for user setting. Threshold values in the form of factory defaults are also possible. Or else it is possible to automatically specify the threshold value following at least one user input. For example the rider may input his weight by means of a user interface and thereafter a threshold value is set for the damping minimum and maximum. The rider's weight can optionally be obtained by a sensor.

These configurations offer the advantage that with the damper device settings originating from the identification device, there will be no settings which cause problems or which the rider does not want. It may be provided that in specific riding situations where a high degree of damper utilization is sensed, control will be briefly deactivated in dependence on identified hazards. To this end, e.g. a suspension control may be provided and configured which comprises damper sensors and executes the control commands of the identification device according to a specific priority.

In an advantageous specific embodiment the bicycle component is provided for a shock absorber device having at least one first and at least one second damper device. The first damper device is preferably assigned to a front wheel and the second damper device, preferably to a rear wheel. The identification device can in particular be suitable and configured to adjust the second damper device with a time delay relative to the first damper device. The identification device is preferably configured to set the damper devices independently from one another.

Such a time-delay control may involve the advantage that the rear wheel damper device can also be optimally readied and adapted to the hazard at the optimal point in time. The identification device is preferably suitable and configured to match the time delay in dependence on the traveling speed of the bicycle. The distance between the front wheel and the rear wheel will in particular be taken into account as well. The first damper device may for example be assigned to a suspension fork. The second damper device may for example be configured as a rear wheel damper.

It is possible for the damper device to be assigned to at least one sensor module for sensing damper utilization. A damper sensor may for example be provided which captures the path and/or the speed of two damper device components which are movable relative to one another. The sensor module may in particular serve to capture how far and/or how fast the damper retracts upon impact and/or extends back after impact. The sensor module may be a part of the bicycle that is assigned to the bicycle component. Or else it is possible for the sensor module to be comprised in the bicycle component.

Some dampers or suspension controls are for example equipped in the factory with appropriate sensors for detecting utilization, in particular to enable automatic adaptation. The identification device is preferably suitable and configured to read out these kinds of sensor data and to take them into account for setting the damper characteristics.

Preferably the identification device is suitable and configured to register the damper utilization after impact on a previously identified hazard. This allows a conclusion whether the adjustment of the damper characteristics in response to the identified hazard did or did not fulfill the purpose. Preferably the identification device can compare the registered damper utilization against values for damper utilization stored in at least one memory device.

The identification device is particularly preferably configured such that controlling the damper device can be adapted if the registered damper utilization deviates from at least one predetermined quantity for damper utilization. Adaptation of controlling is preferably performed such that any future hazards can achieve better damper utilization in the range of the specified quantity. The identification device is preferably equipped with at least one learning algorithm.

The identification device is in particular configured to automatically check the damper settings made and in case that unfavorable damper utilization occurs, to adapt future control commands to the damper device by at least one correction factor so as to have the damper utilization be back in an optimal range in the future.

Also, at least one sensor module may be provided for capturing the spring utilization of at least one suspension device. The identification device is in particular suitable and configured to read out the sensor module and adapt the suspension device control as it was described above regarding the damper utilization.

It is preferred for the identification device to comprise at least one memory device for storing the identified hazards. The memory device is preferably operatively coupled with at least one interface so as to enable for example a user to read out the recorded hazards. It is also possible for the identification device to automatically read out the memory device, for example for error correction. It is also possible for the memory device to be configured for recording the damper utilization and/or the damper settings made. Capturing such data allows the user particular ease of checking his settings on the suspension respectively the shock absorber device.

Preferably the sensor device is accommodated pivotal (about an at least inclined and preferably substantially horizontal axis) on at least one holding device. The holding device is in particular configured with a fastener that is disposed on a component of the bicycle. Moreover the holding device comprises at least one second fastener provided for connection with the sensor device. No-tools mounting and demounting the sensor device to and from the holding device is preferred. The holding device can in particular likewise be attached to and demounted from the bicycle without tools.

The sensor device is particularly preferably mounted to the bicycle by means of the holding device for (vertical) pivoting. The pivotal configuration is in particular so that the emitting angle and/or the receiving angle of the sensor device can be set to the ground. Scaling and/or grid orientation at the holding device may preferably be provided so as to assist the user with aligning the sensor device. Such pivoting of the sensor device has the advantage to allow rapid and easy adaptation of the capturing range for identifying hazards.

Following such pivoting of the sensor device the identification device is usually adapted as regards the damper control after identified hazards. Such adaptation is particularly easy with a learning configuration of the identification device. Then the identification device can automatically obtain the distance between the capturing range of the sensor device and the front wheel for example after going over one or more hazards, taking into account the traveling speed, and then adjust damper control.

Or else it is possible that (vertical) pivoting of the sensor device (about a substantially horizontal axis) and/or some other variation to the capturing range of the sensor device requires manual adjustment of the identification device. For example a light source may be disposed on the sensor device which emits a luminous spot into the capturing range. Then the user can measure the distance between the luminous spot and the front wheel and input the measured distance in the sense of a correction factor via an input device or other interface into the identification device.

The sensor device is in particular disposed on at least one holding device so as to obtain a spaced apart arrangement on at least one component of the bicycle. For example a yoke may be provided. The spaced-apart arrangement is preferably configured such that the sensor device protrudes forwardly above the front wheel but not beyond the front wheel radius. The advantage of this is that if the front wheel hits against something the sensor device will not be damaged. The yoke may have a U-shape. The yoke may be attached to the axle and it may accommodate the sensor device e.g. centered for example above the tire.

A horizontal width of the captured near zone is preferably adjustable. To this end a (horizontal) horizontal receiving angle may be adjustable. This means that the width for capturing is adjustable at a specified distance. A horizontal capturing angle may be adjustable electrically and/or electronically. Electronically adjustable means that only part of an image or a line array is used for evaluation. If the sensor comprises e.g. 4000 (or 2000) pixels in width, then evaluation may be limited to a specific part. When riding on a narrow path only a reduced portion of the available information e.g. over the width may be taken into account.

On the whole both a length of the near zone and also a [sic; word missing] of the near zone can be adjustable. In simple cases a camera may be employed in the sensor device respectively as a receiving unit to select a suitable image area in length and/or width for evaluation. Thus, a near zone can readily be shortened further. In this way the data for processing is reduced. The near zone may be limited to different geometric shapes. The shape of a near zone captured on a plane surface may be configured angular, rounded, and in particular round and preferably oval at least toward the front end (and/or the rear end). In the terrain the actually captured shape changes according to the unevennesses of the terrain.

In another preferred embodiment the sensor device is configured as a, or comprises at least one, ultrasonic sensor. These ultrasonic sensors are inexpensive and very compact in dimensions. These sensors moreover allow to configure a very low-weight identification system which is a significant feature in particular in the field of sports bicycles. Moreover ultrasonic sensors allow reliable identification of hazards and in particular their height, angle, and/or distance. It is also possible for the sensor device to comprise two or three or several ultrasonic sensors. Thus, for example a 2-, 4- and/or 6-channel system and/or multichannel system may be provided.

The sensor device may comprise, or be configured as, at least one infrared sensor. Infrared sensors also offer an inexpensive and reliable sensing technology for identifying hazards and their geometry respectively distance. Two or three or more infrared sensors may be provided.

It is also possible for the sensor device to be configured as, or comprise, at least one radar sensor. The sensor device may be configured as a so-called ultra broadband radar sensor. Such a sensor device is configured to emit at least one ultra short pulse and to receive and evaluate its reflections. For example changes to the phase, frequency, wavelength and/or transit time may be used to identify the hazard.

The bicycle component preferably comprises at least two shock absorber devices such as a suspension fork and a rear wheel damper. The identification device is in particular suitable and configured to control at least two shock absorber devices.

Advantageous specific embodiments provide for at least one angle sensor to identify the steering angle. This allows to recognize whether a hazard is still being bypassed. The current settings can be adapted in dependence on the shape and size of the hazard.

In advantageous and preferred specific embodiments a bicycle component comprises at least all the essential bicycle parts. The bicycle component can in particular be configured as a bicycle so that one configuration provides for the bicycle component to be a bicycle.

The bicycle according to the invention is muscle-powered at least in part. It comprises at least one bicycle component that is configured as is the inventive bicycle component or any of its specific embodiments. Such a bicycle allows very fast and automatic adaptation of damping characteristics during a ride so that the rider can focus his whole concentration on the track and on riding. The bicycle also offers the advantages of the inventive bicycle component.

The method according to the invention is suitable to operate a bicycle component which is provided for an at least partially muscle-powered bicycle. The bicycle comprises at least one shock absorber device having at least one damper device. The damper device is controllable by means of at least one control device. An identification device captures at least one signal. The hazard is identified by way of the captured signal. The damper device is controlled in dependence on the identified hazard. At least one damping characteristic of the damper device is set. The hazard may change or reflect the captured signal.

The method according to the invention offers the advantage of automatically identifying hazards and adjusting the shock absorbers accordingly so that the rider goes over the hazards at optimal damping characteristics.

Preferably the identification device emits at least one signal and receives, and captures as a signal, at least one reflection of the emitted signal coming from the hazard.

Upon identification of the hazard and prior to reaching the hazard the hardness of the damper device is preferably increased. The look-ahead identification of a hazard can in particular store sufficient suspension travel for the hazard so as to enable optimal damping at the hazard.

The method according to the invention particularly preferably employs a bicycle component as it was described in any of the preceding claims. It is also particularly preferred to set the damper device by way of a controllable field generating device and by means of a field-sensitive, rheological medium.

Further advantages and features of the present invention can be taken from the description of the exemplary embodiments which will be discussed below with reference to the enclosed figures.

BRIEF DESCRIPTION OF THE SEVERAL VIEWS OF THE DRAWING

The figures show in.

DESCRIPTION OF THE INVENTION

With reference to the enclosed figures an exemplary embodiment of a bicycle 200 equipped with a bicycle component 401 and shock absorbers 100 will be discussed below.

Figure 1:
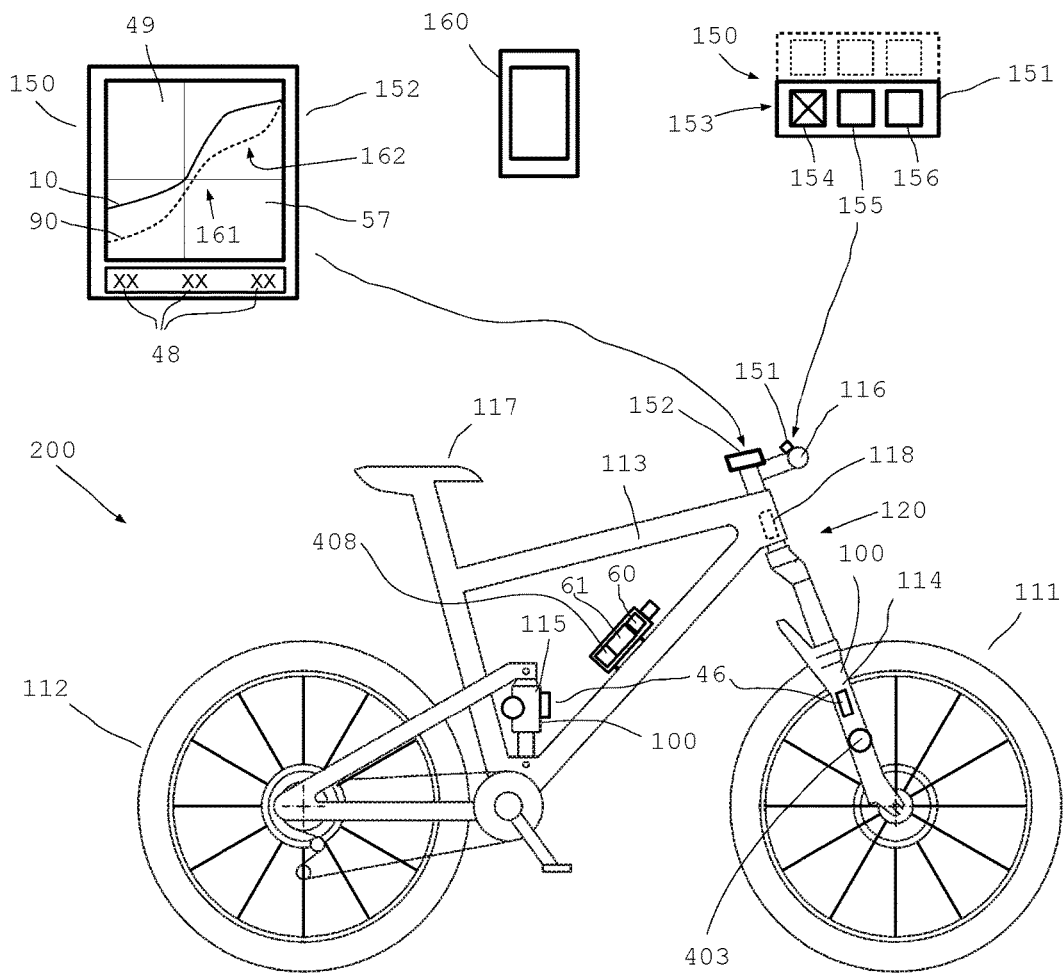
FIG. 1 a schematic view of a bicycle equipped with a bicycle component according to the invention.

FIG. 1 shows a schematic illustration of a bicycle 200 which is configured as a mountain bike and comprises a frame 113 and a front wheel 111 and a rear wheel 112. Both the front wheel 111 and the rear wheel 112 are equipped with spokes and may be provided with disk brakes. A gear shifting system serves to select the transmission ratio. Furthermore the bicycle 200 comprises a steering device 116 with a handlebar. Furthermore a saddle 117 is provided.

The front wheel 111 is provided with a shock absorber 100 configured as a suspension fork 114 and the rear wheel 112 is provided with a shock absorber 100 configured as a rear wheel damper 115.

A central control device 60 is provided together with a battery unit 61 in a water bottle-like container and disposed on the down tube where a water bottle is usually disposed although it may be provided in the frame. The central control device 60 may also be disposed on the handlebar 116.

The central control device 60 serves as a suspension control 200, controlling both the suspension fork 114 and the rear wheel shock absorber 115, separately and in particular in synchrony. Control of the shock absorbers 100 and further bicycle components may be provided in dependence on many different parameters and is also done by way of sensor data. Optionally the suspension and/or damping characteristics of the seat post can be adjusted. It is possible to also control by way of the central control device 60 the shifting system for adjusting different transmission ratios. Capturing an angular position may be provided by means of an angle sensor 118 which detects the angular position of the bicycle 200 in the longitudinal and/or transverse direction.

Additionally each of the shock absorbers 100 comprises at least one control device 46 at an electronic unit provided to be exchangeable. Each of the electronic units may comprise a separate battery unit. However, energy supply is preferred by way of the central battery unit 61 or supported or operated by a dynamo or the like.

The suspension control 200 and the central control device 60 are operated via operating devices 150. Two operating devices 150 are provided, namely an actuating device 151 and an adjustment device 152. The actuating device 151 comprises mechanical input units 153 at the lateral ends or in the vicinity of the lateral ends of the handlebar 116. The adjustment device 152 may be configured as a bicycle computer and may likewise be positioned at the handlebar 116. Or else it is possible to employ a smartphone 160 or a tablet computer or the like for the adjustment device 152 which is for example located in the user's pocket or backpack while no modifications to the settings need to be made.

The actuating device 151 comprises three mechanical input units serving as the controls 154, 155, 156 for operating the shock absorber 100. It is possible to dispose an actuating device 151 for the suspension fork 114 at one of the ends of the handlebar 116 and to provide another actuating device 151 for the rear wheel shock absorber 115 at the other of the handlebar ends. It is also possible to control both shock absorbers in synchrony via an actuating device 151. It is also possible to dispose at one of the lateral ends of the handlebar 116 an actuating device for example with six different controls for adjusting the two shock absorbers 100.

The actuating device 151, which is considerably more robust and sturdier than the operating device 152, is fixedly mounted to the handlebar 116. Each of the controls 154 to 156 designed as pressure switches or push buttons shows protection according to IP54, or better according to IP67 under DIN EN 60529. Protection from impacts is provided at least according to IK06 under DIN EN 622622. The controls 154 to 156 are thus sufficiently protected in normal operation so that the controls are not damaged in operation due to usual shocks or the like. Moreover the robust controls 154 to 156 provide for reliable operation even while riding downhill or the like.

In contrast to this the adjustment device 152, which is for example clipped to the handlebar or remains in the user's pocket or backpack, offers a considerably larger number and/or more clearly arranged adjustment options and it may be employed for modifying a displayed characteristic damper curve 10 in at least two or more sections 161, 162 etc. for setting the desired damper properties. The adjustment device 150 has a display 49 and may also output data 48 for example relating to the damper settings or else data about the current traveling speed etc. In addition to or instead of modifying the damping, at least one spring characteristic or the characteristic of suspension may be modified via the adjustment devices 150 and 152. In particular the suspension hardness in compressing or rebounding may be influenced. Moreover the rest position may optionally be set. One can for example lower the suspension fork 114 in (steep) mountain rides so as to reduce the inclination angle of the bicycle 200.

The display 49 is in particular configured as a graphical control unit or touchscreen 57 so that the user can for example touch a displayed characteristic damper curve 10 with his fingers and modify it by dragging. This allows to generate from the characteristic damper curve 10 shown in a solid line, by touching said line in one or more points, the illustrated characteristic damper curve 90 which is then henceforth employed for the vehicle [sic] control 300. Modifying the characteristic damper curves 10, 90 is also possible while riding. In this case not only damping is modified but at the same time also, or only, the suspension can be modified.

The adjustment device 152 may also serve as a bicycle computer, displaying data about the current speed, and the average speed and/or kilometers per day, per tour, per lap, and total. It is also possible to display the current position, the current elevation of the route traveled and the route profile and also the estimated operational range under the current damping conditions.

The bicycle 200 shown is equipped with a bicycle component 401 according to the invention. The bicycle 200 shown also comprises a suspension which can be controlled using the method according to the invention in connection with the bicycle component 401.

In the configuration shown the bicycle component 401 comprises an identification device 408 that is incorporated in the central control device 60. Or else the identification device 408 may be configured separately and accommodated in any desired suitable place on the bicycle 200. This bicycle component 401 moreover comprises a non-contact sensor device 403 which comprises an ultrasonic sensor 424 attached to the suspension fork 114. The sensor device 403 pivots along with every steering movement so that the sensor device 403 captures the range immediately in front of the front wheel at all times. The sensor device 403 is connected with the identification device 408 through a line (not shown). In the alternative, wireless communication may be provided between the sensor device 403 and the identification device 408.

When in operation the sensor device 403 emits an ultrasonic signal and receives its reflection. The identification device 408 evaluates the received signal, thus recognizing whether the source of the reflection is a hazard in the terrain. The reflected signal is in particular also evaluated by the identification device 408 so as to allow characterizing the hazard. Based on an identified or characterized hazard the identification device 408 delivers a corresponding control signal to the central control device 60.

Then the central control device 60 acts on the first damper device which in this case is the suspension fork 114. Adjustment of the damper device 100 by the control device 60 will be explained in detail with reference to the FIGS. 3*a* and 3*b*.

In response to the identified hazard the identification device 408 in connection with the central control unit 60 controls the second damper device, which is the rear wheel damper 115, time-delayed relative to the suspension fork 114. The time delay between controlling the suspension fork 114 and the rear wheel damper 115 is determined by the identification device 408 in dependence on the traveling speed, again in conjunction with the control device 60. To determine the traveling speed, sensors are disposed on at least one of the wheels 111, 112 and operatively coupled with the central control device 60. Or else the traveling speed may be determined by means of a GPS signal.

Figure 2:
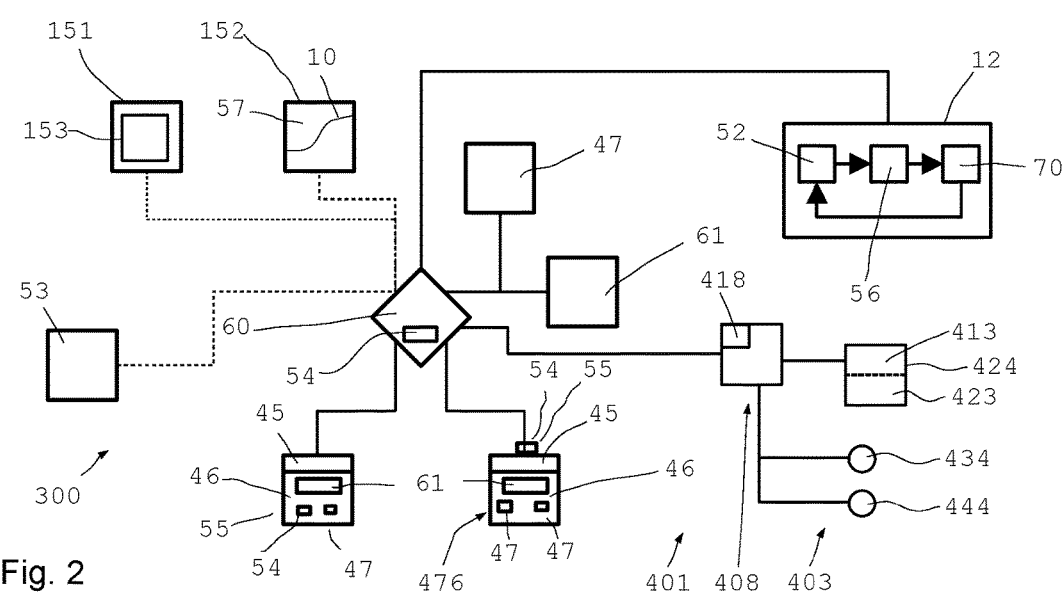
FIG. 2 a schematic view of the controlling structure of the bicycle according to FIG. 1.

FIG. 2 shows a schematic illustration of the suspension control 300 and the communication links of some of the components involved. The central control device 60 may be connected with the individual components either wire-bound or wireless. The control device 60 may be connected with the other components for example through WLAN, Bluetooth, ANT+, GPRS, UMTS, LTE, or other transmission standards. Optionally the control device 60 may be connected wireless with the internet 53 via the link shown in a dotted line.

The control device 60 is linked with the battery unit 61.

Furthermore the control device 60 may be linked with a sensor device 47 or with multiple sensors. The operating devices 150, namely the actuating device 151 and the adjustment device 152, are coupled with the control device 60 either wire-bound or wireless at least temporarily. Although the actuating device 151 is preferably coupled with the control device wire-bound, it may be linked wireless and may be provided with a separate battery such as a button cell or the like.

The actuating device 151 which is robust in structure comprises at least one mechanical input unit 153 in the shape of a switch or the like for outputting switching commands to the control device 60 for switching at least one damper property and/or spring characteristic. This may for example be, activating a lockout or activating a see-saw suppression or adjusting the damper hardness and/or the suspension hardness. Preferably a separate operating knob or the like is provided for each of these properties. Or else it is possible to use one single, mechanical input unit 153 for switching between options. The mechanical input unit 153 or a mechanical input unit may serve for modifying the springing properties. For example the suspension fork can be lowered and the rear wheel damper can be adapted accordingly.

The adjustment device 152 comprises a graphical control unit such as a touch-sensitive screen and can among other things show on the display 49 the current characteristic damper curve 10. For example touching and dragging the characteristic damper curve in single points allows to displace the characteristic damper curve 10 to the sides or up and down, basically as desired. The individual points are preferably linearly linked. The individual points may also be linked dynamically via splines so as to obtain a rounded characteristic damper curve.

The control device 60 is connected with control devices 46 of the shock absorbers 100 at the front wheel and the rear wheel via network interfaces 54 or radio network interfaces 55. The control device 46 possibly provided at each of the shock absorbers 100 takes care of local controlling and may comprise a battery each or else it may be connected with the central battery unit 61. It is preferred to control both shock absorbers via the control device 60.

Preferably each of the shock absorbers 100 is provided with at least one sensor device 47 for obtaining relative motions between the components 101 and 102 and in particular for determining positions of the components 101 and 102 relative to one another. The sensor device 47 may be configured as, or may comprise, a displacement sensor. After obtaining a characteristic value of the relative speed the pertaining damping force and a suitable spring force are set by way of the characteristic damper curve 10 of the shock absorber 100 stored in the memory device 45. A suitable spring force may be determined via the weight of the rider. The weight of the rider can be derived for example by automatically determining the SAG position as a rider has mounted the bicycle. The compression travel as a rider mounts the bicycle allows conclusions about a suitable air pressure in the fluid spring or gas spring, which is then immediately set or approximated automatically or during operation.

FIG. 2 schematically shows the control cycle 12 which is stored in the memory device 45 and is backed up in or programmed into the control device 60. The control cycle 12 is periodically, in particular continuously periodically, performed in operation. In step 52 the sensors 47 capture a current relative motion or relative speed of the first component 101 versus the second component 102. In step 52 a characteristic value is derived from the values of the sensor 47 or the sensors which is representative of the current relative speed. Thereafter in step [sic; no number] the pertaining damping force to be set is then derived from the current respectively obtained characteristic value taking into account the predetermined or selected characteristic damper curve. A measure of the field intensity or current intensity to be currently set is derived therefrom with which the damping force to be set is achieved at least approximately. The measure may be the field intensity or else it may e.g. indicate the current intensity with which the damping force to be set is achieved at least approximately.

In the subsequent step 70 the field intensity to be currently set is generated or the respective current intensity is applied to the electrical coil device 11 which serves as the field generating device, so that within one single cycle or one time period of the control cycle 12 the damping force is generated as it is provided for the selected or predetermined characteristic damper curve relative to the current speed ratio of the first component versus the second component. Thereafter the next cycle starts and step 52 is performed once again. In each cycle or at specific time intervals or given specific events the position or the spring force of the suspension device 26 is checked. To this end the strength of the spring force of the positive chamber 270 and the strength of the spring force of the negative chamber 280 is checked or determined in the fluid spring 260 (see FIGS. 3a and 3b). If a harder fluid spring 261 is desired, the second positive chamber 272 can for example be deactivated so as to provide the fluid spring 260 with a steeper spring force curve. Or the volume of the negative chamber 280 is modified or a position 292 of the equalizing device 290 is changed.

The central control device 60 shown is moreover operatively coupled with the inventive bicycle component 401. The bicycle component 401 consists of the identification device 408 and an ultrasonic sensor 424. The ultrasonic sensor 424 may emit an ultrasonic signal and may receive this signal back. Thus, the sensor 424 combines a transmitting unit 413 and a receiving unit 423 in one component. This enables a particularly discrete and space-saving accommodation. This is an advantage in particular for sports bicycles where low weight and good aerodynamic properties are particularly appreciated. Moreover the outward appearance of the bicycle 200 is not diminished.

In the alternative the identification device 408 may be linked with an infrared sensor 434. A radar sensor 444 may also be provided. This identification device 408 also comprises an integrated memory device 418. This enables storing the identified hazards and the consequent damper settings made. For example a user can retrieve them at a later time via an interface such as a smartphone 160. Moreover the identification device 408 uses the data of a sensor module 476 which is configured as a damper sensor 47. Then the identification device 408 takes into account the captured values of the damper sensor 47 to enable monitoring damper utilization.

Figure 2A:
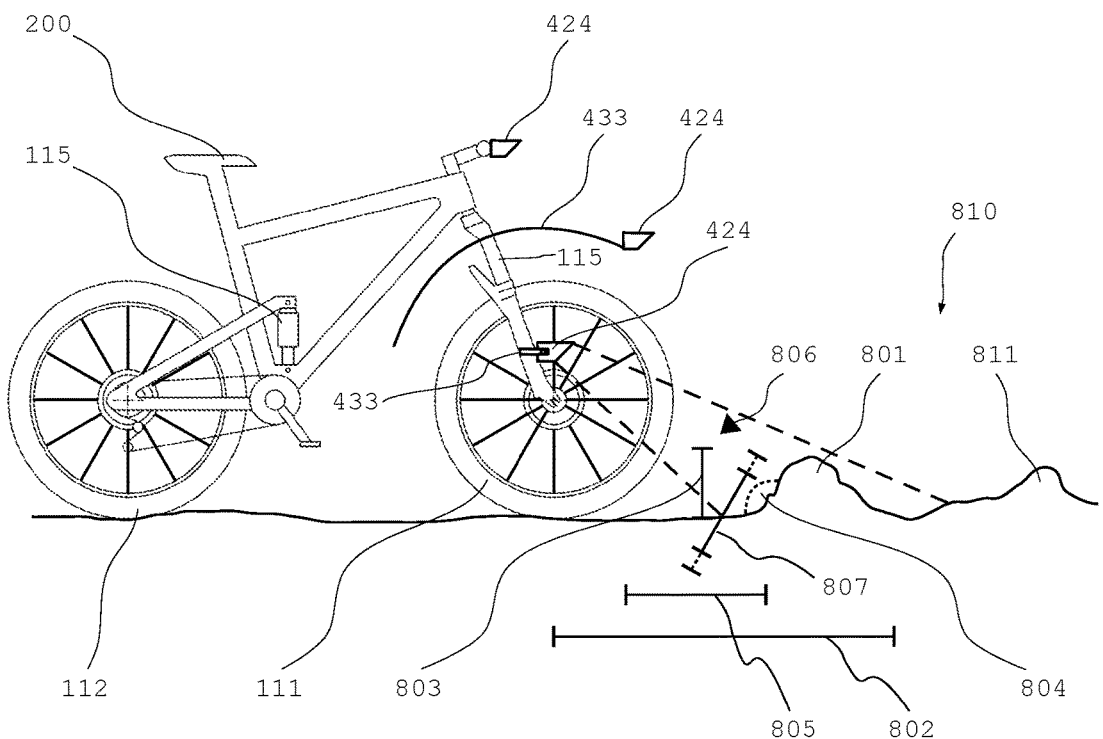
FIG. 2a a schematic view of the bicycle according to FIG. 1 in a terrain.

FIG. 2a shows the bicycle 200 of FIG. 1 in a simplistic drawing of a terrain. Along the traveling path of the bicycle 200 there are hazards 801, 811 which are drawn as elevations respectively unevennesses of the ground. These hazards may include: rocks, steps, roots, dips, bumps, potholes, shoulders, elevations, sidewalk edges, cobblestone pavements, tree stumps, branches, and tree trunks.

This suspension fork 114 has an ultrasonic sensor 424 attached to it by means of a holding device 433. The holding device 433 is dimensioned such that it does not protrude forwardly beyond the front wheel 111. This is to avoid damage to the sensor device 403 in case the front wheel 111 hits something.

Pivoting the sensor 424 on the holding device 433 about a horizontal axis allows to optimally align the capturing range 806 of the sensor 424. Such alignment is preferably done once only when installing the bicycle component 401. It is also possible for the user to carry out his own preferred alignment of the capturing range 806.

Another sensor device 403 is exemplarily disposed in the range of the handlebar 116. Another exemplary sensor device 403 is shown that is attached in the front to a holding device 433 which is configured as a fender or mudguard respectively. The holding device 433 is e.g. attached to the fork bridge of the suspension fork 114. As an alternative a sensor device 403 is attached to a dropout of the suspension fork 114 respectively to the front wheel hub axle.

The exemplary arrangements of the sensor device 403 are shown by way of illustration. In fact it is preferred to provide one sensor device 403 only for a bicycle 200. The sensor device 403 may comprise a number of sensors. One sensor device 403 may for example be provided with four or six ultrasonic sensors 424 so as to enhance resolution respectively expand the capturing range 806.

The positions shown for attaching the sensor devices 403 offer the advantage that in a steering movement the sensors can directly pivot along with the components to which they are attached. Thus, the sensor devices 403 and the capturing range 806 pivot in the same direction in which the front wheel travels. Or else a sensor device 403 may be provided on the head tube or other parts of the bicycle 200 which do not pivot in a steering movement. The alignment of the sensor device 403 toward the ground must be determined or obtained ahead of use, in relation to the type and structure of the sensor.

A rider wishing to use the identification device 408 may activate it on the operating device 150. Then the identification device 408 emits ultrasound waves into the capturing range 806 via the sensor 424. If the section of terrain within the capturing range 806 is free of hazards, the identification device 408 recognizes this by way of the reflected ultrasound waves. Then the identification device 408 does not perform any modifications to the damper settings. The damper devices 1 are set as is provided for the suspension control 300 in normal operation or according to the specifics which the user prefers.

Now if some hazard 801 appears in the capturing range 806 during the further ride, the ultrasound wave reflections change. The identification device 408 registers and evaluates the signal changes. The evaluation allows in particular to determine the height 803 of the hazard above the ground and the distance 805 of the hazard from the front wheel 111. The reflected signals also allow to determine the angle 804 of a surface of the hazard relative to the bicycle 200. It is for example possible to at least approximately characterize the shape or three-dimensional geometry of the hazard.

By way of the distance 805 the identification device 803 determines the optimal point of time for adjusting the damper settings to the expected impact on the hazard 801. The damper settings preferably remain unchanged until the hazard 801 is reached so as to maintain the best riding characteristics for a normal or plane surface. Now as the front wheel 111 reaches the hazard 801, the identification device 408 activates the central control device 60 so as to adjust the damping to be softer. Parameters such as the height 803 or angle 804 may be used to readjust the damper precisely by the amount that is optimal for that hazard.

If the damper device 1 is adjusted for example by applying a field intensity to a magnetorheological fluid 9, then the damper adjustment may be done immediately before the front wheel 111 hits, due to the particularly short response time. The damper devices 1 having these very short response times are particularly suitable for use with the identification device 408 since the capturing range 806 may be focussed on the shortest possible near zone 802. This allows to avoid undesired capturing of hazards 801 which are not run over following a spontaneous steering movement.

The shorter the near zone 802 extends in front of the front wheel 111 the higher the probability that the captured hazard 801 will be run over and will not be bypassed e.g. following a change of direction. Due to the very short response time of the presented damper settings, near zones 802 can be realized extending for example over a distance which the bicycle 200 travels in one second or even only one tenth of a second. The setting time of the damper device 1 is preferably under 10 milliseconds. Then the identification device 408 can dynamically adapt the near zone 802 within which hazards 801 are identified which can trigger damper adjustment, in dependence on the current traveling speed.

When the hazard 801 has been overcome and no other hazard 811 is located in the near zone 802 then the damper device 1 is reset to the basic setting for plane terrain. Due to the capturing range 806 focussing on a very short near zone 802, any hazards 811 outside the near zone 802 will not be captured. This is by no means a drawback since cycling in open terrain involves frequent, fast changes of direction. Therefore it is not inconceivable that any hazards 811 located farther away will not be run over but bypassed. The short near zone 802 thus offers the advantage that the damper device 1 can be precisely matched to the surface over which the rider travels.

The width 807 and/or the length of the capturing range 806 respectively the "monitored" near zone 802 are preferably adjustable. Thus, in FIG. 2a the solid line is a schematic representation of a narrow width 807 and the dotted line, of a greater width 807. For adjusting the width 807 (or the associated capturing angle) and/or the length, using a camera for example enables to employ for evaluation just sections of the actually captured image area. A horizontal respectively vertical capturing angle is evaluated according to the quantity of the pixels used in the lateral and longitudinal directions.

After the front wheel 111 has passed the hazard 801, the identification device 408 computes the point of time at which the rear wheel 112 will reach the hazard 801 on the basis of the current traveling speed. Thus, the second damper device 620 for the rear wheel 112 can likewise be readied at an optimal point of time for the impact caused by the hazard 801.

The identification device 408 shown communicates with a sensor module 476 of the damper device 1 which is configured as a damper sensor 47. As has been described above, this sensor 47 is provided for determining a relative speed of two components 101, 102 moving relative to one another. By way of the relative speed captured by this sensor 47 the identification device 408 can autonomously monitor whether or not the damper settings were adequate for the run over hazard 801.

For example if the bicycle 200 runs over a hazard 801 and the load on the damper device 1 is not optimal, then the identification device 408 recognizes this by way of the mismatched relative speeds of the damper components 101, 102. Then when a comparable hazard 801 appears, the monitoring [sic] device 408 adjusts the damper settings taking into account a suitable correction factor. When the subsequently measured relative speed of the damper components 101, 102 lies within the nominal range then the identification device 408 maintains the correction factor. When the damper utilization again lies outside the nominal range, then the identification device 408 adjusts the correction factor by a specific amount.

This identification device 408 is equipped with a memory device 418 so that the properties of the identified hazard 801 and the subsequently made damper settings and correction factors if any can be stored. This allows for one, particular ease of maintenance and checking by the servicing staff who can read out the memory device 418 via a suitable interface.

It also provides the rider with useful information which he can retrieve from the memory device 418 for example on his smartphone 160. The information stored in the memory device 418 is particularly preferably linked with position data which can be utilized for example by means of a GPS-capable smartphone 160. By means of this data in conjunction with digital maps the user can draw up very detailed route profiles which by way of the stored hazards provide a very illustrative image of the prevailing ground or terrain conditions. The identification device can thus be employed for improving available maps for bicycle tours and tracks.

Any data recorded during operation can be stored locally in a memory device 418. Then the data (identified hazards 801 and/or raw data) can be stored together with time data about the recording time and/or with GPS- and/or route data either locally and/or directly and/or at a later time, manually or automatically, in a memory 45 in the internet 53. This enables subsequent analysis and also comparison with other team members or friends or else against earlier rides.

It is also possible for the identification device 408 to be configured to recognize a jump of the bicycle 200. A jump can be captured for example by the fact that no or just very little reflection occurs. Such recognition of absent ground beneath the front wheel 111 has the advantage that the damper device 1 can be optimally set for the bicycle's 200 landing after the jump. In order to recognize whether the bicycle 200 will first land on the front wheel 111 or on the rear wheel 112 after the jump, the identification device 408 may comprise at least one position sensor or the like.

In another configuration the sensor device 403 is preferably equipped with a receiving unit 423 configured as a camera. This receiving unit 423 serves to capture optical projections of the hazard and for the identification device 408 to utilize them for identifying hazards. Although a transmitting unit 413 is not absolutely necessary and may be omitted, it may be used to ensure defined lighting.

Two or more receiving units 423 configured as cameras or at least one stereo camera may be provided so as to enable to derive optical projections with three-dimensional or spatial information. This allows to determine the distance, shape, and size of the hazard in great detail and reliably.

The sensor device 403 may comprise a camera including a light source and it may be configured as a triangulation device. Then the light source projects a defined pattern onto the hazard and the camera records this pattern from a number of viewing angles, computing the shape or size of the hazard from the distortion of the pattern. It is also possible for the sensor device 403 to emit light by means of a light source and for the identification device 408 to obtain the distance from the hazard by way of the measured transit time.

Figure 2B:
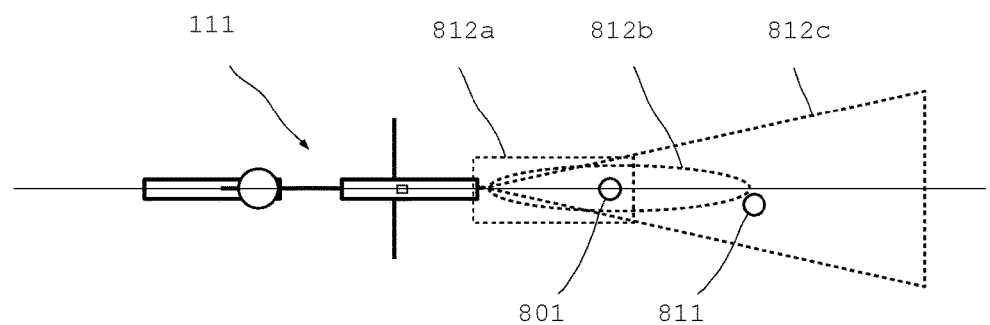
FIG. 2b a schematic top view of a bicycle showing three different near zones.

FIG. 2b shows a simplistic top view of a bicycle with three different near zones drawn. The near zone 812a e.g. covers a rectangular and rather small range immediately in front of the front wheel of the bicycle. The length of the near zone 812a is shorter than the length of the bicycle and the width is narrower than one half or one third of the length of the bicycle. This near zone 812a may possibly be useful in downhill rides.

The near zone 812c extends considerably farther forwardly. The length of the near zone 812c is more than double the length of the bicycle and the width may be larger than half the length of the bicycle or than the length of the bicycle. The near zone 812c diverges forwardly at an acute angle (triangle shape). This near zone 812c that has a considerable length and width may be useful on smooth roads where very few hazards appear or are expected. Therefore a larger near zone can be periodically checked for hazards.

The third indicated near zone 812b is oval in shape and extends forwardly from the front wheel with the narrow ends extending in the traveling direction. The front end is rounded so that any hazards lying farther away are captured only if they lie directly in the currently planned route while the center range also checks lateral areas which might enter the traveling line in case of a steering movement.

Selecting any of the near zones may be done automatically. It is possible to automatically determine a type of way 810 and when a type of way 810 has been identified a corresponding near zone 812a, 812b or 812c (or yet another shape) is selected. It is also possible to manually select a near zone. Or else a type of way and thus an associated near zone is selected manually.

In FIG. 2b the hazard 801 is identified as a potentially relevant hazard in the case of all three of the near zones. The hazard 811, however, is captured only by the near zone 812c. The probability of riding over the hazard 801 as determined by the identification device 408 is high enough to issue appropriate control commands. The hazard 811 is identified as relevant only when the near zone 812c is set. Since the distance is still comparatively large, the hazard 811 continues to be periodically captured until the probability of overriding has exceeded a predetermined amount and the proper control commands are issued.

Figure 3A:
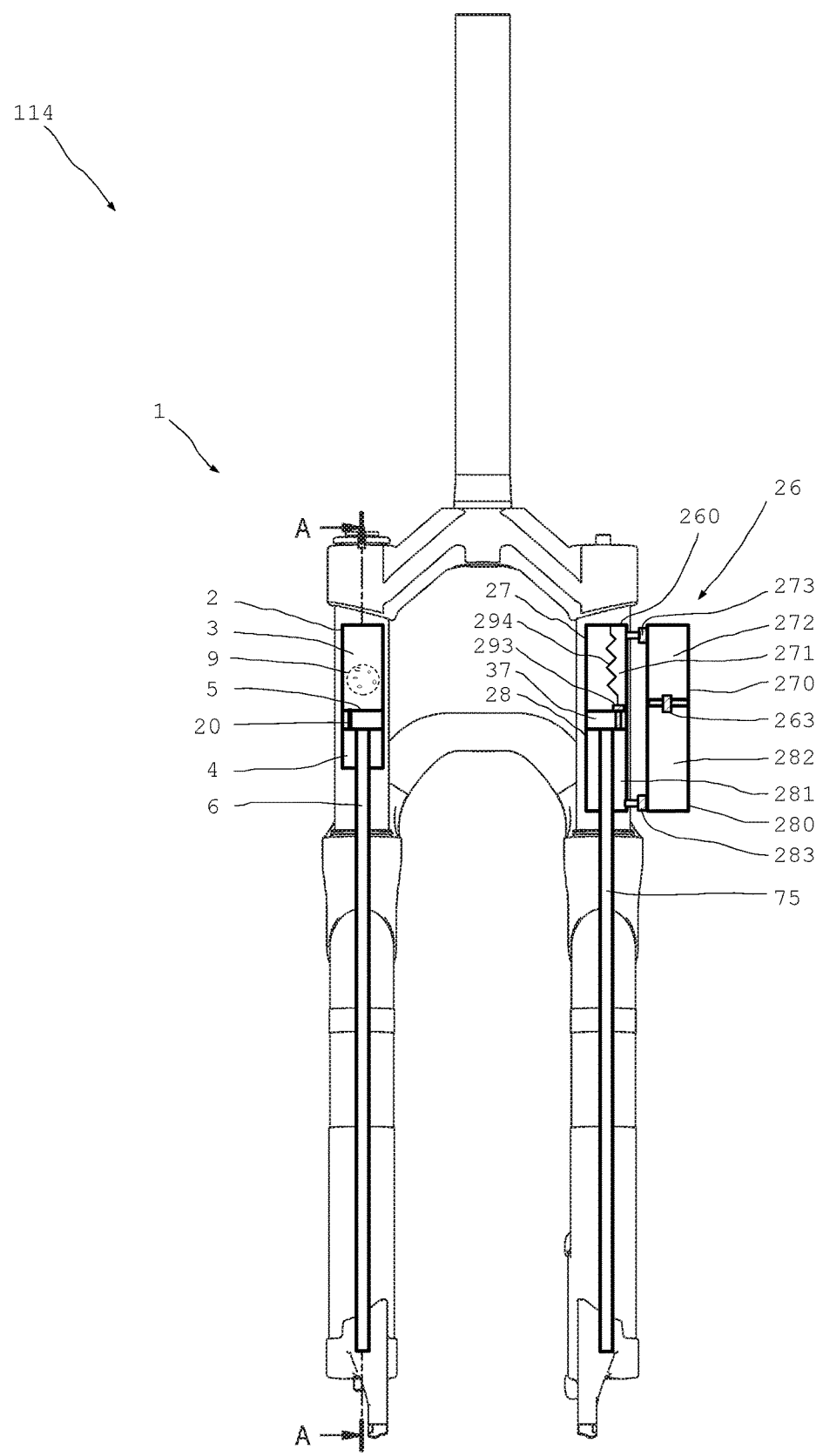
FIG. 3a a schematic view of a suspension fork of the bicycle according to FIG. 1.
Figure 3B:
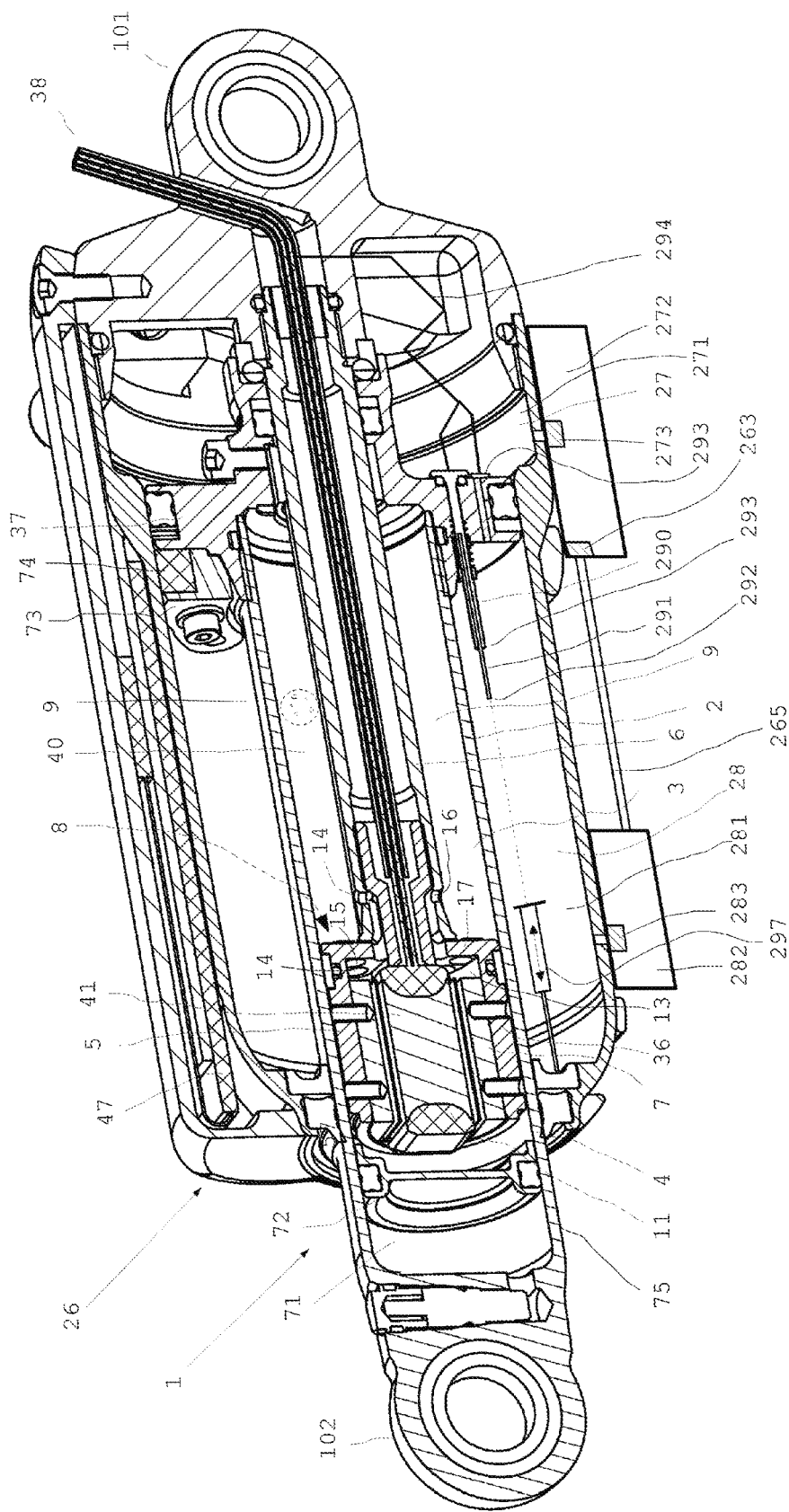
FIG. 3b a schematic sectional view of a shock absorber of the bicycle according to FIG. 1.

FIG. 3a shows a simplistic view of a suspension fork 114 as it is employed for the front wheel 111, and FIG. 3b shows the rear wheel damper 115, which will be described together below.

The suspension fork 114 comprises a shock absorber 100. The shock absorber 100 comprises a damper device 1 in one leg of the suspension fork and a spring device in the other leg of the suspension fork. In other configurations the damper device 1 and the spring device 26 may be jointly disposed in one leg.

The shock absorber 100 is fastened by the first end serving as the component 101 and the second end serving as the component 102, to different parts of the supporting structure 120 or the frame 113 for springing and damping relative motions.

The damper device 1 comprises a first damper chamber 3 and a second damper chamber 4 in one combined damper housing 2. The two damper chambers 3 and 4 are separated from one another by the damper piston or damping piston 5 in or at which a magnetorheological damping valve 8 comprises a damping duct 20 through which the magnetorheological damping fluid 9 (MRF) courses. While the damper housing 2 is fastened to the upper part of the suspension fork 114 and thus to the frame 113, the damper piston 5 is connected with the lower dropout via the piston rod 6.

The other suspension strut of the suspension fork has disposed in it the suspension device 26 which comprises a spring unit 260 configured as a fluid spring 261. The suspension device comprises a housing in which the spring piston 37 that is linked to the piston rod 75 separates a positive chamber 270 from a negative chamber 280. The positive chamber 270 forms a positive spring and the negative chamber 280 forms a negative spring the spring force of which tends to be lower in the rest position but is opposed to the spring force of the positive spring. This achieves good responsivity since the fluid spring 261 will respond already to weak shocks. The fluid spring 261 is filled with a fluid and presently with a gas and preferably with air.

The positive spring comprises two chamber sections 271 and 272 which can be separated from or connected with one another by means of a control valve 273 as required. The negative spring comprises two chamber sections 281 and 282 which can be separated from or connected with one another by means of a control valve 283 as required.

The chamber section 272 of the positive chamber 270 and the chamber section 282 of the negative chamber 280 can be interconnected via the control valve 263. In this way the control valves 263, 273 and 283 can equalize the pressure between the positive chamber and the negative chamber in every desired spring position so as to change the characteristic of the fluid spring 261. The control valves 263, 273 and 283 serve as actuators the operation of which is controlled by the control device 60. This allows to freely adjust the rest position and to also lower a suspension fork for example in mountain rides. In a rear wheel shock absorber an additional volume if any can be deactivated in a chamber section and thus the springing at the rear wheel can be set harder for uphill rides. It is possible to provide only one of the control valves 263, 273 and 283. For example only the control valve 273 (or 283) may be provided so that opening and closing the control valve 273 (or 283) will modify the volume of the positive chamber 270 (negative chamber 280) and thus the spring characteristic of the spring unit 260.

It is also possible for the suspension fork 114 to comprise in the suspension piston 37 one control valve 293 only which is connected with the control device 60 via a cable or a control line 294. Opening the control valve 293 enables gas exchange in any desired axial position of the suspension piston 37. Pressure compensation in a suitable position modifies the rest position and results e.g. in lowering, or in transfer to the normal position of a lowered suspension fork.

Suitably controlling the control valves may also influence the pressure level in the positive chamber and/or the negative chamber.

FIG. 3b shows a simplistic cross-sectional view of a shock absorber 100 which is presently employed for example in the rear wheel damper 115.

The shock absorber 100 comprises a damper device 1. The shock absorber 100 is fastened by its first end serving as the component 101 and the second end serving as the component 102, to different parts of the supporting structure 120 or the frame 113 for damping relative motions.

In the damper housing 2 a damping piston unit 40 is provided which comprises a damping piston 5 with a damping valve 8 and a piston rod 6 linked therewith. The damping piston 5 is provided with the magnetorheological damping valve 8 therein which presently comprises a field generating device 11 and in particular an electric coil for generating a suitable field intensity. A cable 38 serves for a power supply and/or data transmission. The magnetic field lines run in the central region of the core 41 approximately perpendicular to the longitudinal extension of the piston rod 6 and thus pass through the damping ducts approximately perpendicular. This causes the magnetorheological fluid present in the damping ducts to be effectively influenced so as to allow efficient damping of the flow through the damping valve 8. The shock absorber 100 comprises a first damper chamber 3 and a second damper chamber 4 separated from one another by the damping valve 8 configured as the piston 5. In other configurations an external damper valve 8 is possible which is disposed external of the damper housing 2 and connected via supply lines.

The first damper chamber 4 is followed toward its end 102 by the equalizing piston 72 and thereafter the equalizing space 71. The equalizing space 71 is preferably filled with a gas and serves to equalize the piston rod volume which in compressing enters into the entire damper housing 2.

Magnetorheological fluid 9 serving as the field-sensitive medium is present not only in the damping valve 8 but presently in the two damping chambers 3 and 4 on the whole.

The flow duct 7 between the first damper chamber 3 and the second damper chamber 4 extends, starting from the second damper chamber 4, firstly through the fan-type damping ducts which at the other end lead into the collection chamber or collection chambers. The magnetorheological fluid collects there after exiting the damping ducts before passing through the flow apertures 14, 15 into the first damping chamber 3. In compressing, i.e. in the compression stage, flow passes through all of the flow apertures 14, 15. This means that the major portion of the flow presently passes through the flow apertures 15 and the one-way valves 17 at the flow apertures 15 automatically open such that the magneto-rheological fluid can pass out of the second damper chamber 4 into the first damper chamber 3.

In the compressed state illustrated the first damper chamber 3 is radially entirely surrounded by the second spring chamber 28 of the spring device 26. This allows a particularly compact structure.

The shock absorber 100 comprises an equalizing device 290 which enables pressure compensation between the positive chamber 270 and the negative chamber 280. The position of pressure compensation is adjustable. To this end the equalizing device 290 may comprise e.g. a telescopic equalizing plunger 291 which can extend out of the spring piston 37 to different lengths. Thus the extendable equalizing plunger 291 will sooner (or later) reach a stopper at the end of the negative chamber 280. The equalizing device 290 may be connected with the control device 60 by electric cable 294. As the equalizing plunger 291 abuts, it opens a fluid opening so as to cause gas compensation and thus pressure compensation between the positive chamber 270 and the negative chamber 280.

In rebounding the equalizing device 290 will automatically close again. Depending on the compensating position, the pressure relationships set at the fluid spring 261 differ so as to influence the suspension accordingly. It is also possible to provide the end of the negative chamber 280 with an adjustable or displaceable stopper for a stationary equalizing plunger 291 to obtain variations of the spring characteristic. Alternatively or in addition, a length-adjustable stopper 297 may be provided against which the equalizing plunger 291 abuts in an adjustable and variable position 292 or 296. As the equalizing plunger 291 abuts, the equalizing plunger 291 opens the control valve 293 or forms a flow aperture through which the pressure can be compensated between the positive chamber and the negative chamber. FIG. 3b shows a position 292 with extended equalizing plunger 291. The equalizing plunger 291 may be retracted so as to obtain another position 296 in which the equalizing device 290 opens.

Furthermore an electrically controlled equalizing valve 293 which may be supplied with energy via the electric cable 294 may be provided to compensate part or all of the pressure in suitable positions between the positive chamber 270 and the negative chamber 280.

The equalizing plunger 291 is preferably spring-loaded.

Furthermore, the positive chamber 270 may include a number of chamber sections 271, 272. In addition to the basic chamber being the chamber section 271, the chamber section 272 may be activated as needed or required for changing and in particular reducing the spring hardness. Or else the chamber section 272 may be deactivated and separated from the chamber section 271 when the spring hardness is to be changed and in particular increased.

In analogy the negative chamber 280 may consist of a number of chamber sections 281, 282. In addition to the first chamber section 281 the second chamber section 282 may be activated as needed or required. Correspondingly the chamber section 282 can be deactivated and separated from the chamber section 281. In another configuration the positive chamber 270 comprises chamber sections 271 and 272, and the negative chamber 280 comprises chamber sections 281 and 282. In this configuration the equalizing device 290 comprises control valves 273, 283 and 263 and a connecting line 265 for interconnecting the chamber sections 272 and 282 as required. When the three control valves 273, 283 and 263 open then the pressure will be compensated between the positive chamber 270 and the negative chamber 280. The position 292 of pressure compensation can be selected as desired and independently of an equalizing plunger 291. Therefore this configuration does not require any equalizing plunger 291 nor any control valve 293 in the piston 37, nor any adjustable stopper 297. The chamber sections may in all the cases be activated and deactivated in compressing or rebound in dependence on the position.

The spring piston 37 is provided at the end of the damper housing 2. Disposed thereat is a holder 73 supporting a magnet 74. The magnet 74 is part of a sensor 47. The sensor 47 comprises a magnetic potentiometer which captures a signal that is representative of the position of the magnet 74 and thus of the spring piston 37. This potentiometer 47 does not only permit to determine a relative location but presently also permits to determine the absolute stage of compression or rebound of the shock absorber 100. It is also possible to employ an ultrasonic sensor for capturing a distance.

List of reference numerals:

| | |
|---|---|
| 1 | damper device |
| 2 | damper housing |
| 3 | first damper chamber |
| 4 | second damper chamber |
| 5 | damping piston |
| 6 | piston rod |
| 7 | damping duct, flow duct |
| 8 | damping valve |
| 9 | MRF |
| 10 | characteristic damper curve |
| 11 | electric coil device |
| 12 | control cycle |
| 14, 15 | flow aperture |
| 16 | through hole |
| 17 | one-way valve |
| 26 | spring device |
| 27 | positive chamber |
| 28 | negative chamber |
| 37 | spring piston |
| 38 | cable |
| 40 | damping piston unit |
| 41 | core |
| 45 | memory device |
| 46 | control device |
| 47 | damper sensor, sensor |
| 48 | data |
| 49 | display |
| 52 | step |
| 53 | internet |
| 54 | network interface |
| 55 | radio network interface |
| 56 | step |
| 57 | touchscreen, graphical control unit |
| 60 | control device |
| 61 | battery unit |
| 70 | step |
| 71 | equalizing space |
| 72 | equalizing piston |
| 73 | holder |
| 74 | magnet |
| 75 | piston rod |
| 90 | characteristic damper curve |
| 100 | shock absorber |
| 101 | component |
| 102 | component |
| 111 | wheel, front wheel |
| 112 | wheel, rear wheel |
| 113 | frame |
| 114 | suspension fork |
| 115 | rear wheel damper |
| 116 | handlebar |
| 117 | saddle |
| 118 | angle sensor |

-continued

List of reference numerals:

| | |
|---|---|
| 120 | supporting structure |
| 150 | operating device |
| 151 | actuating device |
| 152 | adjustment device |
| 153 | mechanical input unit |
| 154-156 | operating member |
| 160 | smartphone |
| 161-164 | range |
| 169-173 | point |
| 200 | bicycle |
| 260 | spring unit |
| 261 | fluid spring |
| 263 | control valve |
| 265 | line |
| 270 | positive chamber |
| 271, 272 | chamber section |
| 273 | control valve |
| 280 | negative chamber |
| 281, 282 | chamber section |
| 283 | control valve |
| 290 | equalizing device |
| 291 | equalizing plunger |
| 292 | position |
| 293 | equalizing valve |
| 294 | cable, control line |
| 296 | position |
| 297 | stopper |
| 300 | suspension control |
| 401 | bicycle component |
| 403 | sensor device |
| 408 | identification device |
| 413 | transmitting unit |
| 418 | memory device |
| 423 | receiving unit |
| 424 | ultrasonic sensor |
| 433 | holding device |
| 434 | infrared sensor |
| 444 | radar sensor |
| 476 | sensor module |
| 801 | hazard |
| 802 | near zone |
| 803 | height |
| 804 | angle |
| 805 | distance |
| 806 | capturing range |
| 807 | width |
| 810 | type of way |
| 811 | hazard |
| 812a-c | near zone |

The invention claimed is:

1. A bicycle component for an at least partially human-powered bicycle, comprising:
a control device;
a shock absorber device having at least one damper device to be controlled by said control device;
a detection device with at least one sensor device and a receiver unit for a contactless acquisition of a detection signal;
said sensor device being disposed such that said sensor device is pivoted at least partially on occasion of a steering movement of the bicycle;
said detection device being configured for detecting a future difficulty in a terrain within a close range as a function of the detection signal and configured for controlling said shock absorber device as a function of a detected future difficulty in the terrain within the close range, and wherein at least one damping property of said shock absorber device is adjusted by way of an output signal of said detection device; and
said control device being configured for adjusting said damper device to a harder setting, up to a point at which the future difficulty in the terrain is reached.

2. The bicycle component according to claim 1, wherein said damper device comprises at least a first damper chamber and at least a second damper chamber which are coupled to one another via at least one controllable damping valve, and wherein said damping valve is assigned a field-generating device to be controlled by said detection device and for generating and controlling a field strength in at least one damping duct of said damping valve, and wherein a field-sensitive rheological medium is provided in said damping duct.

3. The bicycle component according to claim 1, wherein, in order to control said damper device, said detection device is configured for taking into account only difficulties in the terrain in a predefined close range of less than 10 meters.

4. The bicycle component according to claim 3 wherein said detection device is configured for classifying a type of route and for predefining and the close range as a function of the type of route.

5. The bicycle component according to claim 4, wherein said detection device is configured to classify the type of route as a function of a frequency and intensity of the difficulties in the terrain being traveled over.

6. The bicycle component according to claim 3, wherein said detection device is configured for predefining the close range as a function of a velocity of the bicycle, and wherein the close range extends over a distance which the bicycle travels in one second at the velocity.

7. The bicycle component according to claim 3, wherein said detection device is configured to set the damping property of said damper device in less than 30 ms seconds owing to a detected difficulty in the terrain in the close range.

8. The bicycle component according to claim 3, wherein said sensor device is mounted on a mounting device so as to be pivotable, with the result that a transmission angle and/or reception angle with respect to the ground is adjusted and/or wherein a horizontal width and/or a length and/or a shape of the close range can be adjusted.

9. The bicycle component according to claim 1, wherein said detection device is configured for deriving a probability value for travel over a detected difficulty in the terrain, and for adjusting said shock absorber device as a function of a detected difficulty in the terrain when the probability value exceeds a predetermined probability.

10. The bicycle component according to claim 1, wherein said detection device is configured for determining a level of the difficulty in the terrain above the ground and/or an angle of at least one region of the difficulty in the terrain with respect to the ground, and for taking into account the angle when controlling the damper device.

11. The bicycle component according to claim 1, wherein said detection device is configured, in controlling the damper device, for taking into account at least one preset limiting value for maximum and/or minimum damping.

12. The bicycle component according to claim 1, wherein said shock absorber device comprises at least a first damper device assigned to a front wheel of the bicycle and at least a second damper device assigned to a rear wheel of the bicycle, and wherein said detection device is configured for setting the second damper device with a delay with respect to said first damper device.

13. The bicycle component according to claim 1, wherein said damper device is assigned at least one sensor module for detecting a damper load factor, and wherein said detection device is configured for reading out said sensor module and configured for registering the damper load factor as a result of a setting of a damper property which has been made in response to a detected difficulty in the terrain, and said detection device is suitable for adapting a control of said damper device when the registered damper load factor deviates from a predefined measure of the damper load factor.

14. The bicycle component according to claim 1, wherein said detection device comprises at least one memory device for recording the detected difficulties in the terrain.

15. The bicycle component according to claim 1, wherein said sensor device is mounted on at least one component of the bicycle which is pivoted in the case of a steering movement.

16. The bicycle component according to claim 1, wherein said sensor device is disposed spaced apart from the bicycle on at least one mounting device, and wherein a distance between said sensor device and the bicycle does not exceed a radius of a front wheel of the bicycle.

17. The bicycle component according to claim 1, wherein said sensor device is a sensor selected from the group consisting of an ultrasound sensor, an infrared sensor and a radar sensor.

18. The bicycle component according to claim 1, wherein said detection device is configured for controlling at least two said shock absorber devices.

19. The bicycle component according to claim 1, which comprises at least one angle sensor for detecting a steering lock.

20. A method of operating a bicycle component of an at least partially human-powered bicycle having at least one shock absorber device with at least one damper device, the method comprising:
acquiring a detection signal with a sensor of a detection device;
pivoting the sensor device on occasion of a steering movement of the bicycle;
acquiring with the sensor a detection signal of terrain information forward of the bicycle;
determining a difficulty in a terrain being traveled based on the detection signal;
controlling the damper device by way of at least one control device as a function of the detected difficulty in the terrain, and adjusting at least one damping property of the damper device as a function of the detected difficulty in the terrain; and
upon detecting the difficulty in the terrain and up to a point when the difficulty in the terrain is reached, adjusting the damper device to a harder setting.

21. The method according to claim 20, which comprises emitting at least one signal with the detection device, and receiving and acquiring as the detection signal at least one reflection, originating from the terrain, of the emitted signal.

* * * * *